US010539008B2

(12) United States Patent
Jarrot et al.

(10) Patent No.: US 10,539,008 B2
(45) Date of Patent: Jan. 21, 2020

(54) SYSTEMS AND METHODS FOR DETERMINING TOOL CENTER, BOREHOLE BOUNDARY, AND/OR MUD PARAMETER

(71) Applicant: Schlumberger Technology Corporation, Sugar Land, TX (US)

(72) Inventors: Arnaud Jarrot, Cambridge, MA (US); Emmanuel Legendre, Sevres (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 132 days.

(21) Appl. No.: 15/762,636

(22) PCT Filed: Sep. 21, 2016

(86) PCT No.: PCT/EP2016/072366
§ 371 (c)(1),
(2) Date: Mar. 23, 2018

(87) PCT Pub. No.: WO2017/050799
PCT Pub. Date: Mar. 30, 2017

(65) Prior Publication Data
US 2018/0266239 A1    Sep. 20, 2018

(30) Foreign Application Priority Data
Sep. 24, 2015   (EP) .................................... 15290243

(51) Int. Cl.
*E21B 47/09*     (2012.01)
*E21B 47/00*     (2012.01)
(Continued)

(52) U.S. Cl.
CPC ........ *E21B 47/091* (2013.01); *E21B 47/0002* (2013.01); *E21B 47/024* (2013.01);
(Continued)

(58) Field of Classification Search
CPC .. E21B 47/091; E21B 47/0002; E21B 47/024; E21B 47/0905; G01V 1/44; G01V 3/20
See application file for complete search history.

(56) References Cited

U.S. PATENT DOCUMENTS 7,757,782 B2*   7/2010  Tashiro .................... E21B 4/18
                                                166/250.17
7,775,272 B2*   8/2010  Nelson ............... E21B 17/1028
                                                166/213
(Continued)

FOREIGN PATENT DOCUMENTS

EP          0556114 A1     8/1993
WO       WO0000786 A1     1/2000
WO     WO2013019553 A2    2/2013

OTHER PUBLICATIONS

International Search Report and Written Opinion issued in International Patent application PCT/EP2016/072366, dated Nov. 8, 2016. 13 pages.

(Continued)

Primary Examiner — Yong-Suk Ro

(57) ABSTRACT

Systems and methods are provided for estimating the tool center position of a downhole tool, the geometry of the borehole, and/or a mud parameter based on sensor measurements from the downhole tool, even when the downhole tool center is moving over time. At least one sensor may obtain a set of measurements that relates to distance-to-borehole in a borehole at a number of azimuths. A processor may estimate a set of values defining borehole boundary and a set of positions of a center of the downhole tool in the borehole, at least in part by estimating the borehole boundary based on the set of measurements assuming a previously estimated position of the center of the downhole tool is true and estimating the position of the center of the downhole tool based on the set of measurements assuming a previously (Continued)

estimated borehole boundary is true, and iterating at least until convergence.

16 Claims, 8 Drawing Sheets

(51) Int. Cl.
*E21B 47/024* (2006.01)
*G01V 1/44* (2006.01)
*G01V 3/20* (2006.01)

(52) U.S. Cl.
CPC .......... *E21B 47/0905* (2013.01); *G01V 1/44* (2013.01); *G01V 3/20* (2013.01)

(56) References Cited

U.S. PATENT DOCUMENTS

| | | | |
|---|---|---|---|
| 9,328,604 B2 * | 5/2016 | Dubourg | E21B 47/082 |
| 2008/0186805 A1 | 8/2008 | Han | |
| 2008/0307875 A1 | 12/2008 | Hassan et al. | |
| 2009/0222209 A1 | 9/2009 | Morys | |
| 2015/0012217 A1 | 1/2015 | Legendre | |
| 2017/0115423 A1 | 4/2017 | Hori et al. | |
| 2017/0335676 A1 * | 11/2017 | Dykstra | E21B 47/024 |
| 2018/0156000 A1 * | 6/2018 | Cleven | E21B 23/02 |
| 2018/0252840 A1 * | 9/2018 | Abellan | E21B 47/12 |

OTHER PUBLICATIONS

Extended European Search Report issued in European Patent Application 15290243.3 dated Mar. 11, 2016. 8 pages.

\* cited by examiner

SYSTEMS AND METHODS FOR DETERMINING TOOL CENTER, BOREHOLE BOUNDARY, AND/OR MUD PARAMETER

BACKGROUND

This disclosure relates to estimating the position of the center of mass of a downhole tool, the geometry of the borehole, and/or the mud parameter based on acoustic measurements, even when the downhole tool center is moving over time.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

As a borehole is drilled, a logging-while-drilling (LWD) or measurement-while-drilling (MWD) operation may obtain a number of measurements using a downhole tool attached to the drill string. In a drilling environment, however, the position of the center of the downhole tool may vary substantially over one revolution. Indeed, the position of the tool center may vary by a few centimeters or more owing to the shocks and vibrations occurring in the vicinity of the drill bit. This variation of the tool center may result in measurement inaccuracies.

Furthermore, the geometry of the borehole is a substantial parameter of interest, since the geometry of the borehole provides useful information on the characteristics of the geological formation that surrounds the borehole. Because the relative displacement of the center of mass of the downhole tool may vary over time, however, a direct measurement of the borehole geometry while drilling may be difficult or may produce inaccurate results.

Some solutions for estimating the position of the tool center involve using an accelerometer to refer position of the tool center over time. While this may suffice over short periods of time, the accuracy of estimating tool center using an accelerometer quickly decreases over time. Moreover, when using an accelerometer, the position of the tool center may remain unknown with respect to the borehole geometry, which may vary at different depths. Additionally, while other techniques may involve performing multiple caliper measurements on the borehole, dividing the borehole into multiple different sectors, and identifying a histogram of measured radii, these techniques may be less accurate than desired and/or may require certain specific assumptions to complete.

SUMMARY

This summary is provided to introduce a selection of concepts that are further described below in the detailed description. This summary is not intended to identify key or essential features of the subject matter described herein, nor is it intended to be used as an aid in limiting the scope of the subject matter described herein. Indeed, this disclosure may encompass a variety of aspects that may not be set forth below.

To estimate the position of the center of mass of a downhole tool, the geometry of the borehole, and/or the mud parameter based on acoustic measurements, even when the downhole tool center is moving over time, systems and methods are provided. One method may include placing a downhole tool into a borehole in a geological formation and obtaining a set of measurements using the downhole tool. The set of measurements may include a measurement representative of a distance between a sensor and a borehole boundary and a measurement representative of an azimuth of the downhole tool. Using a processor, a set of borehole boundary distances from a point in the borehole and a tool center trajectory in relation to the point in the borehole may be iteratively estimated. This may be done at least partly by estimating at an iteration one of the set of the borehole boundary distances and tool center trajectory based on the set of measurements assuming an estimation relating to the other of the set of borehole boundary distances and tool center trajectory at a previous iteration is true; and estimating at the iteration the other of the set of borehole boundary distances and tool center trajectory based on the set of measurements assuming the estimation relating to the one of the set of borehole boundary distances and tool center trajectory at the iteration is true. The estimating of the set of borehole boundary distances and the estimating of the tool center trajectory at a further iteration may be repeated until convergence.

In another example, a system may include a sensor disposed in a downhole tool configured obtain a set of measurements representative of a distance between the sensor and a borehole boundary, a sensor disposed in the downhole tool configured to obtain a set of measurements representative of an azimuth of the tool, and a processor that may estimate a set of borehole boundary distances from a point in the borehole and a tool center trajectory in relation to the point in the borehole. The processor may do so by iteratively estimating at an iteration one of the set of the borehole boundary distances and tool center trajectory based on the set of measurements assuming an estimation relating to the other of the set of borehole boundary distances and tool center trajectory at a previous iteration is true; and estimating at the iteration the other of the set of borehole boundary distances and tool center trajectory based on the set of measurements assuming the estimation relating to the one of the set of borehole boundary distances and tool center trajectory at the iteration is true. The processor may repeat at least the estimating of the set of borehole boundary distances and the estimating of the tool center trajectory at a further iteration until convergence.

In another example, one or more tangible, non-transitory, machine-readable media comprising instructions, when executed by a processor, may cause the processor to receive a set of measurements obtained by a downhole tool. The set of measurements may include measurements representative of distances from a sensor to a borehole boundary and of azimuths obtained over a plurality of measurement time instants. The instructions may also include instructions to iteratively estimate, using the processor, a set of borehole boundary distances from a point in the borehole and a tool center trajectory in relation to the point in the borehole. This may be done at least partly by estimating at an iteration one of the set of the borehole boundary distances and tool center trajectory based on the set of measurements assuming an estimation relating to the other of the set of borehole boundary distances and tool center trajectory at a previous iteration is true; and estimating at the iteration the other of the set of borehole boundary distances and tool center trajectory based on the set of measurements assuming the estimation relating to the one of the set of borehole boundary distances and tool center trajectory at the iteration is true. The instructions may include repeating at least the estimating of the set of borehole boundary distances and the estimating of the tool center trajectory at a further iteration until convergence.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
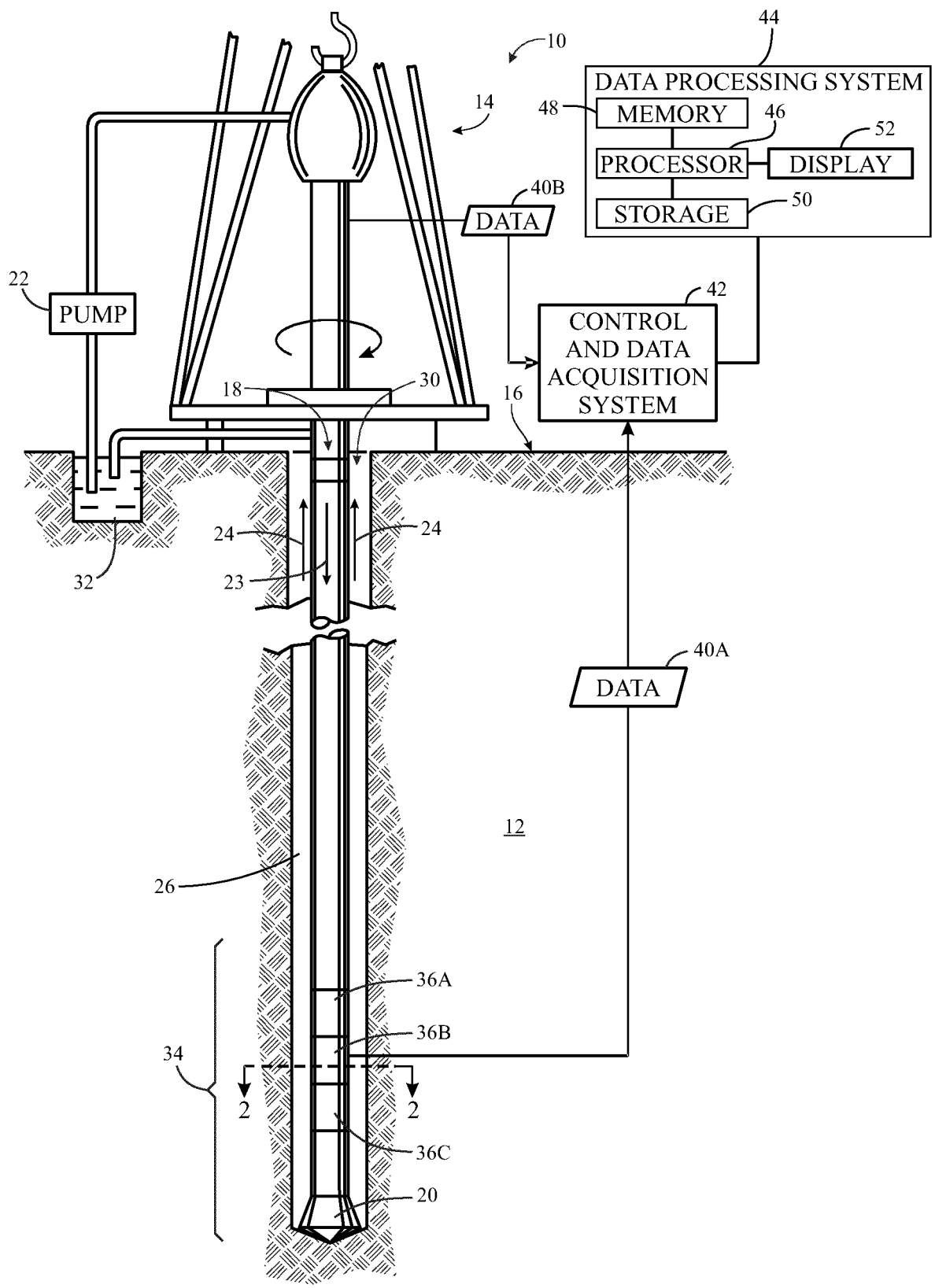
FIG. 1 is drilling system that may determine tool center of mass, borehole boundary, and/or mud parameter, in accordance with an embodiment.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, a drilling environment may cause the position of the center of a downhole tool to vary substantially. The position of the tool center may vary by a few centimeters or more owing to the shocks and vibrations occurring in the vicinity of the drill bit. Despite these variations in the tool center, the systems and methods of this disclosure may estimate the position of the center of mass of the downhole tool, the borehole boundary, and/or the mud parameter using a set of indirect measurements. The set of measurements used in the systems and methods of this disclosure include a measurement of tool azimuth together with an acoustic measurement. The set of measurements may include other additional measurements, as well, that can be related to the parameters of interest (e.g., measurements from an accelerometer, gyroscope, and/or strain gauge).

Through iterative inversion, a set of distances to the borehole boundary, a set of tool center positions over time (or tool center trajectory), and even a mud parameter value may be determined based on these measurements. The mud parameter may relate to a characteristic of the mud, such as acoustic slowness, electromagnetic permability, or the like, that may affect the measurement as the tool center trajectory changes. In one example, when the mud parameter is known, an inversion may be used determine the borehole boundary and the tool center positions. The set of distances to the borehole boundary may be estimated, assuming a prior estimate of tool center trajectory is true; and the tool center trajectory may be estimated, assuming the prior estimate of borehole boundary is true. The solution may be obtained by iterating to convergence.

In another example, when a mud parameter is unknown, an inversion may be used determine the set of borehole boundary distances, the tool center trajectory, and the mud parameter value. The set of distances to the borehole boundary may be estimated, assuming a prior estimate of tool center trajectory is true; the tool center trajectory may be estimated, assuming the prior estimate of borehole boundary is true; and the mud parameter value may be estimated, assuming the prior estimates of tool center trajectory and borehole boundary are true, and the set of measurements may be updated based on the newly estimated mud parameter value. The solution may be obtained by iterating to convergence.

Once the solution, i.e. values of the tool center trajectory, the borehole boundaries and potentially the mud parameter, is obtained, it may be stored and/or used. An example of using the solution is to correct images of the borehole acquired by imaging sensors such as acoustic and/or electromagnetic imaging sensors based on the solution.

FIG. 1 illustrates a drilling system 10 that may be used to estimate borehole boundary, tool center, and/or mud parameter as mentioned above. The drilling system 10 may be used to drill a well into a geological formation 12. In the drilling system 10, a drilling rig 14 at the surface 16 may rotate a drill string 18 having a drill bit 20 at its lower end. As the drill bit 20 is rotated, a drilling fluid pump 22 is used to pump drilling mud 23, which may also be referred to as "mud" or "drilling fluid," downward through the drill string 18 in the direction of the arrow to the drill bit 20. The drilling mud 23, which is used to rotate, cool, and/or lubricate the drill bit 20, exits the drill string 18 through the drill bit 20. The drilling mud 23 carries drill cuttings away from the bottom of a borehole 26 as it flows back to the surface 16, as shown by the arrows, through an annulus 30 between the drill string 18 and the formation 12. As the drilling mud 23 flows through the annulus 30 between the drill string 18 and the formation 12, the drilling mud 23 may begin to invade and/or mix with formation fluids stored in the formation (e.g., natural gas or oil), forming return drilling mud 24. At the surface 16, the return drilling mud 24 is filtered and conveyed back to a mud pit 32 for reuse.

As illustrated in FIG. 1, the lower end of the drill string 18 includes a bottom-hole assembly (BHA) 34 that may include the drill bit 20 along with various downhole tools (e.g., 36A, 36B, and/or 36C). The downhole tools 36A, 36B, and/or 36C are provided by way of example, as any suitable number of downhole tools may be included in the BHA 34. The downhole tools 36A, 36B, and/or 36C may collect a variety of information relating to the geological formation 12 and the state of drilling the well. For instance, the downhole tool 36A, 36B, and/or 36C may be a logging-while-drilling (LWD) tool that measures physical properties of the geological formation 12, such as density, porosity, resistivity, lithology, and so forth. Additionally or alternatively, the downhole tool 36A, 36B, and/or 36C may be a measurement-while-drilling (MWD) tool that measures certain drilling parameters, such as the temperature, pressure, orientation of the drilling tool, and so forth. In the example of this disclosure, the downhole tool 36B includes sensors for measuring a distance from said sensor to the borehole. Such sensors may be acoustic sensors that can obtain acoustic measurements of the borehole 26 at various azimuths. These acoustic measurements may be used to estimate the borehole 26 geometry; the tool center trajectory of the downhole tool 36B as it moves over time; and/or properties of the drilling mud 23 or return drilling mud 24, which relates to the speed of sound through the drilling mud 23 or return drilling mud 24. Alternatively or additionally, the sensors for measuring the distance to the borehole may also electromagnetic sensors such as the ones mentioned in US patent application No. 2015-0012217, herein incorporated by reference in its entirety and for all purposes. For the purposes of this disclosure, the fluid (23 and/or 24) in the borehole 26, in which the measurements are made, will be referred to simply as the "mud." The downhole may also include a sensor for measuring the azimuth of the tool, such as a magnetometer or a rotational speed sensor. The tool may comprise any additional sensor, such as an accelerometer, a gyroscope, a strain gauge, etc, for obtaining additional information on the tool trajectory. It may also comprise additional sensors for determining properties of the formation, such as imaging sensors.

The downhole tools 36A, 36B, and/or 36C may collect a variety of data 40A that may be stored and processed in the BHA 34 or, as illustrated in FIG. 1, may be sent to the surface 16 for processing via any suitable telemetry (e.g., electrical signals pulsed through the geological formation 12 or mud pulse telemetry using the drilling mud 24). Additionally or alternatively, certain measurements may be ascertained at the surface and provided as data 40B. The data 40A and/or 40B may be sent via a control and data acquisition system 42 to a data processing system 44.

The data processing system 44 may include a processor 46, memory 48, storage 50, and/or a display 52. The data processing system 44 may use the data 40A and/or 40B to determine the parameters of interest mentioned above. To process the data 40A and/or 40B, the processor 46 may execute instructions stored in the memory 48 and/or storage 50. As such, the memory 48 and/or the storage 50 of the data processing system 44 may be any suitable article of manufacture that can store the instructions. The memory 46 and/or the storage 50 may be ROM memory, random-access memory (RAM), flash memory, an optical storage medium, or a hard disk drive, to name a few examples. The display 52 may be any suitable electronic display that can display the well logs and/or other information relating to properties of the well as measured by the downhole tools 36A, 36B, and/or 36C. It should be appreciated that, although the data processing system 44 is shown by way of example as being located at the surface, the data processing system 44 may be located in the downhole tools 36A, 36B and/or 36C. In such embodiments, some of the data 40A may be processed and stored downhole, while some of the data 40A may be sent to the surface (e.g., substantially in real time). This may be the case particularly in LWD, where a limited amount of the data 40A may be transmitted to the surface during drilling operations.

Figure 2:
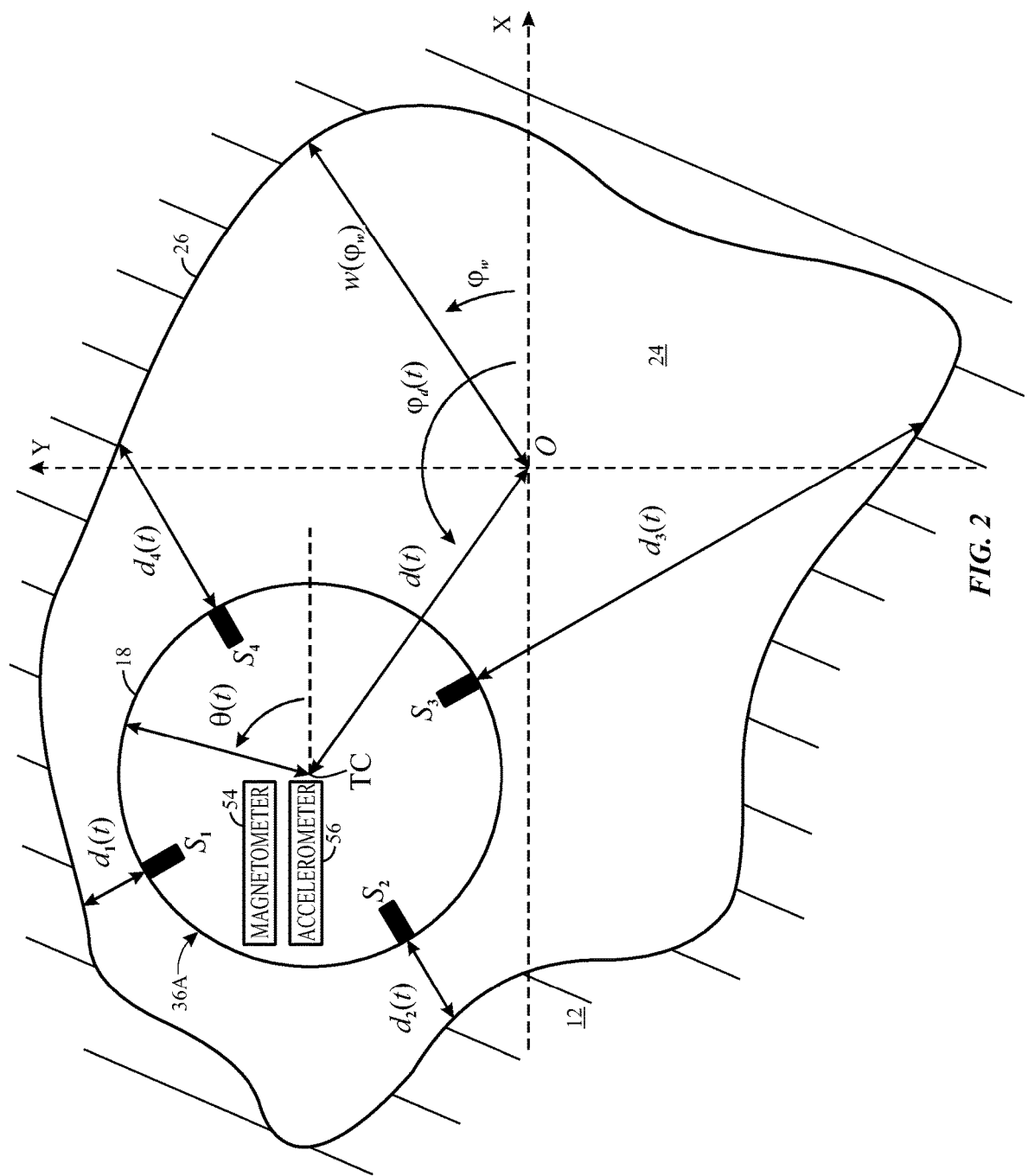
FIG. 2 is a cross-sectional view of the borehole, in which the downhole tool may obtain a measurement of center of mass and/or borehole boundary positions when mud parameter is known, in accordance with an embodiment.

Although the borehole 26 may be expected to take a circular or elliptical shape, this may not be the case. FIG. 2 illustrates an exaggerated example of imperfections that may be found in the geometry of the borehole 26, and represents a cross-sectional view of borehole 26 along cut lines 2-2 of FIG. 1. Drill marks, breakdowns, scratches, key seating, and other actions could produce such imperfections. It may be valuable to identify these variations in the geometry of the borehole 26.

In FIG. 2, the downhole tool 36B is represented as an acoustic downhole tool with four acoustic sensors denoted $S_1$, $S_2$, $S_3$, and $S_4$. It should be appreciated that, while the downhole tool 36B is represented as a while-drilling tool, the techniques of this disclosure are intended to encompass any suitable downhole tool 36B of any suitable conveyance that can obtain acoustic measurements at multiple azimuths (e.g., by rotation of the downhole tool 36B). Moreover, it should further be appreciated that, while the downhole tool 36B is described as an acoustic downhole tool, the systems and methods of this disclosure may also support measurements from types of downhole tools, such as electromagnetic tools with also electromagnetic sensors. Further, although four acoustic sensors $S_1$, $S_2$, $S_3$, and $S_4$ are shown by way of example in FIG. 2, any suitable number of acoustic sensors may be used in other embodiments. Indeed, in one example, a single acoustic sensor (e.g., $S_1$) may be used without other acoustic sensors. The robustness of the method is however enhanced when multiple sensors are taking measurements or when additional measurements (coming for instance from accelerometers) are performed.

Furthermore, while the positions of the acoustic sensors $S_1$, $S_2$, $S_3$, and $S_4$ are azimuthally offset from one another at right angles, the acoustic sensors $S_1$, $S_2$, $S_3$, and $S_4$ may take any other suitable azimuthal position. When at least one pair of acoustic sensors (e.g., $S_1$, and $S_3$) are disposed diametrically opposite one another, the estimations of this disclosure may be more efficient, but even tool configurations without diametrically opposite acoustic sensors (e.g., $S_1$ and $S_3$) may be used to obtain a solution according to the systems and methods of this disclosure.

The acoustic sensors $S_1$, $S_2$, $S_3$, and/or $S_4$ may be any suitable acoustic measurement sensors that can be used for caliper measurements in the borehole 26. For example, the acoustic sensors $S_1$, $S_2$, $S_3$, and/or $S_4$ may be pulse echo ultrasonic sensors, sonic acoustic sensors, ultrasonic pitch-catch sensors the like. Acoustic signals (such as ultrasonic pulses) may be emitted by the downhole tool 36B and propagate through the drilling mud 24. The acoustic signals may be at least partly reflected upon reaching the borehole 26 boundary at the geological formation 12. These reflections (e.g., echos) may be detected by the respective acoustic sensors $S_1$, $S_2$, $S_3$, and/or $S_4$. The amount of time it takes for the acoustic signals to travel from the borehole 26 boundary to the acoustic sensor $S_1$, $S_2$, $S_3$, and/or $S_4$ is referred to as the propagation time or travel time, and this depends on the distance to the borehole 26 boundary and the characteristics of the drilling mud 24 (in particular, the mud slowness $s_m$).

Indeed, the acoustic travel times may be used to estimate a distance between the active element of each acoustic sensor $S_1$, $S_2$, $S_3$, and $S_4$ and the borehole boundary 26 at the geological formation 12, denoted in FIG. 2 as $d_1(t)$, $d_2(t)$, $d_3(t)$, and/or $d_4(t)$, where t represents the time of the measurement. At different time instants $t_j$, each acoustic sensor $S_1$, $S_2$, $S_3$, and/or $S_4$ may provide a measure of the travel time for the acoustic signal to travel between the respective acoustic sensor $S_1$, $S_2$, $S_3$, and/or $S_4$ and the geological formation 12. The travel times measured by the acoustic sensors $S_1$, $S_2$, $S_3$, and/or $S_4$ may be denoted as $T_1[t_j]$, $T_2[t_j]$, $T_3[t_j]$, and/or $T_4[t_j]$. When the propagation speed of the acoustic signal through the drilling mud 24 ($v_m$) is known (note that the propagation speed $v_m$ is the inverse of the mud slowness $s_m$), the distances between the sensors $S_i$ and the borehole 26 boundary at each point in time may be described according to this relationship: $d_i[t_j]=T_i[t_j] \cdot v_m$.

It is understood that the tool of FIG. 2 has been described with acoustic sensors but sensors $S_1$, $S_2$, $S_3$, and/or $S_4$ may be any type of sensors able to measure a distance between the tool and the borehole, such as electromagnetic sensors. If the measured parameter enabling to obtain a representative value for the distance is not the travel time, it will be understood that the measurements set will be different but the method is still applicable. For instance, if the sensors are electromagnetic sensors as disclosed above, the measurements representative of the distance will be a ratio of currents measured by electrodes of the sensor, a known relationship enabling to link this ratio to the distance. In this case, the measurement set will include the ratio of current as a measurement variable instead of the travel time. The parameter of the mud that matters for linking the measurement representative of the distance taken by the sensor and the true distance in this case is a mud dielectric value.

A measure of the azimuth $\theta[t_j]$—that is, an angle formed by the downhole tool 36B in relation to a reference, such as the geomagnetic referential—may be provided by one or more magnetometers 54 of the downhole tool 36B. Additionally or alternatively, the azimuth, may be measured using rotational speed sensors 56.

These measurements may relate to one another by defining an arbitrary reference point O that can be used to relate the tool center TC to the borehole 26 boundary. A distance d(t) between the tool center TC and the arbitrary reference point O, in combination with the angle formed by an arbitrary azimuth reference and the line d(t) that is denoted as $\varphi_d(t)$, can be used to define the tool center TC position at a given point in time. The positions of the borehole boundary in relation to the arbitrary reference point O may also be defined. The distance between the arbitrary reference point O and the borehole 26 boundary at a given azimuth $\varphi_w$ may be denoted as $w(\varphi_w)$.

Figure 3:
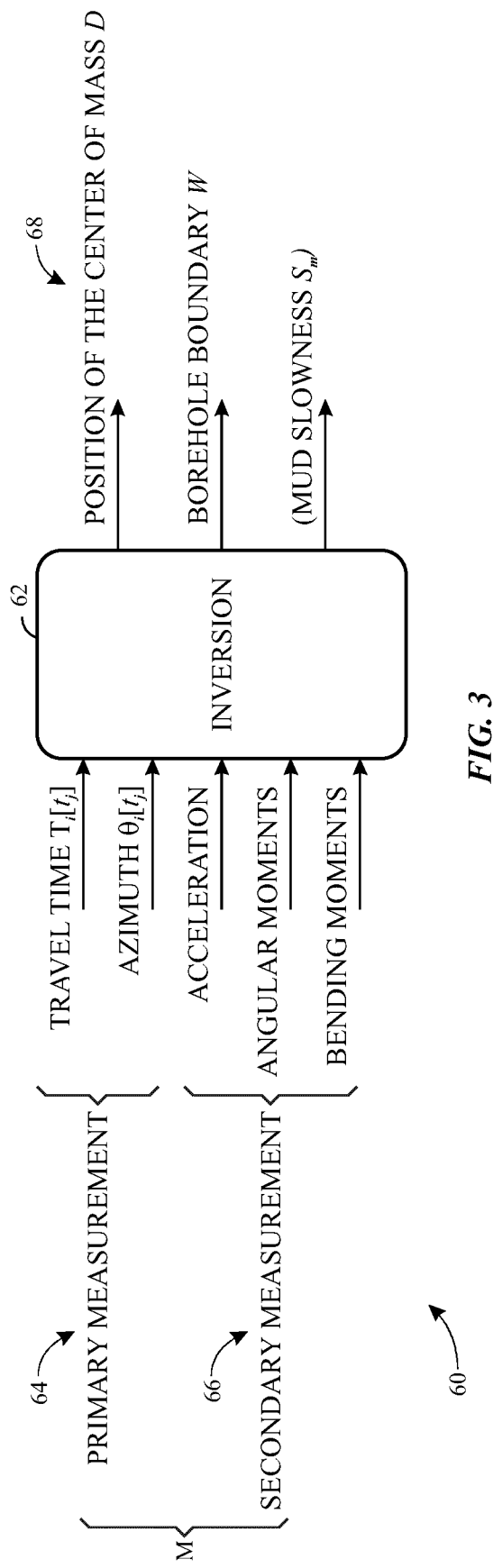
FIG. 3 is a flow diagram of a method for obtaining tool center of mass, borehole boundary, and/or mud parameter, in accordance with an embodiment.

Keeping the geometrical relationships of FIG. 2 in mind, a flow diagram 60 of FIG. 3 describes an inversion 62 that may determine parameters of interest from a set of measurements from the downhole tool 36B. The data processing system 44 may carry out the inversion 62. The inversion 62 may receive a measurement set M as an input. The measurement set M may include at least primary measurements 64, but may also include secondary measurements 66. The primary measurements 64 include at least an acoustic caliper measurement—such as the travel time $T_i[t_j]$ for each of the acoustic sensors $S_1$, $S_2$, $S_3$, and/or $S_4$ at each $t_j$ point in time and/or the distance $d_i[t_j]$ derived from the travel time—as well as the azimuth $\theta[t_j]$ of the downhole tool 36B when the acoustic caliper measurement is obtained. The secondary measurements 66 may provide additional accuracy, if used, and may include a current acceleration of the downhole tool 36B, an angular moment applied to the downhole tool 36B, and/or bending moments that are applied to the tool string 18 (e.g., as measured by an accelerometer the accelerometers 56, which may include shock sensors and/or gravimeter, a gyroscope, and/or a strain gauge, which may indicate a bending mode as compared to a torsion mode, and may relate to the position of the downhole tool 36B offset).

Using at least the primary measurements 64, the inversion 62 may ascertain the parameters of interest 68. The parameters of interest 68 may include a set of positions of the center of mass of the downhole tool over time, i.e. a tool center trajectory 36B (e.g., $D=\{d[t_j] \angle \varphi_d[t_j]\}$), as well as a set of all points located on the borehole 26 boundary (e.g., $W=\{\varphi_w \rightarrow w(\varphi_w)\}$), and, if not already known, the value of the mud parameter, such as the mud slowness $s_m$.

It is understood that determining a parameter related to the parameter of interest by a well-known mathematical relationship having only known coefficient (as, for instance, $v_m$ and $s_m$) is considered as determining a parameter of interest.

Estimation when Mud Parameter is Known

Figure 4:
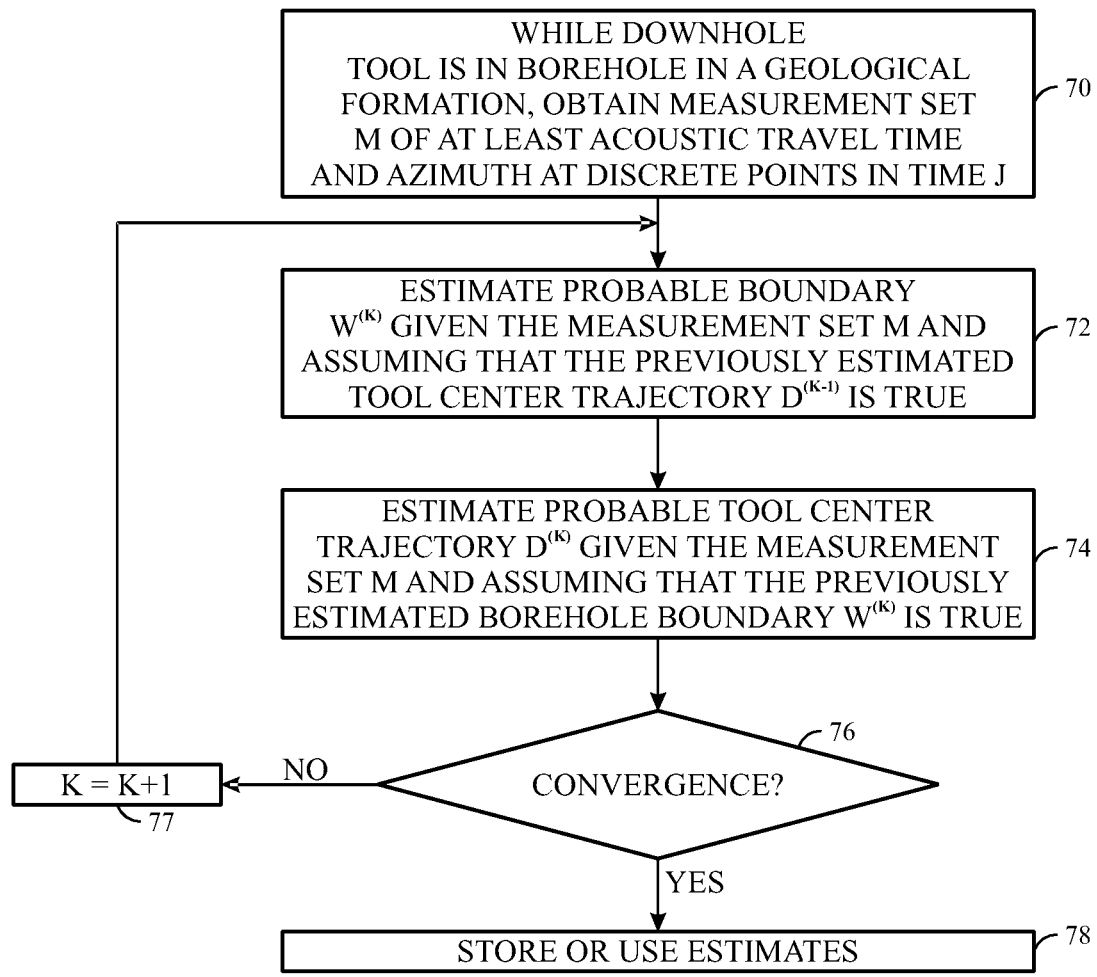
FIG. 4 is a flowchart of a particular example of an inversion to obtain probable center of mass and probable borehole boundary, given a measurement set of acoustic sensor measurements and tool azimuth, in accordance with an embodiment.

FIG. 4 illustrates one example of a flowchart for determining the set of estimated tool center trajectory D and the set of the points located on the borehole boundary positions W when the mud parameter linking the measurement to the distance, ie the mud slowness $s_m$ when the sensor is an acoustic sensor, is known. The flowchart of FIG. 4 begins when, while the downhole tool 36B is in the borehole 26, the measurements set M is obtained for a set of discrete points in time $t_j$ (block 70).

In the example of FIG. 4, it is assumed that the mud slowness $s_m$ is known. Because the mud slowness $s_m$ is known, the propagation speed of the acoustic wave from the sensors $S_1$, $S_2$, $S_3$, and/or $S_4$ through the drilling mud 24 (denoted $v_m$) is also known. With a known propagation speed $v_m$, is known, the distance $d_i[t_j]$ as obtained using one of the acoustic sensors $S_i$ may be expressed as $d_i[t_j]=T_i[t_j] \cdot v_m$.

Thus, in this case, the set of all measurements M may be denoted $M=\{(d_i[t_j], \theta[t_j])_j=No \ldots Nm^{i=1 \cdots 4}\}$. In other words, the measurements set that will be used for the method comprise all the measurements taken during a determined time period by all the sensors. When the method is applied for each rotation of the tool, No is the first measurement obtained during the Nth rotation of the tool Nm being the last measurement taken during this rotation. Of course, the measurement set may comprise a greater number of measurements, such as measurements taken during several rotations, or even a lower number of measurements, even though the robustness of the method is enhanced when the measurements set comprise a greater number of measurements. It is also understood that the time period during which the measurements of the measurement set are taken is a period chosen so that the tool is situated at a stationary depth in the borehole, typically a time period that corresponds to less than one to several dozens of rotations of the tool.

The set of all estimated tool trajectory D may be denoted $D=\{d[t_j] \angle \varphi_d[t_j]\}$, and the set of all points located on the borehole 26 boundary may be denoted as $W=\{\varphi_w \rightarrow w(\varphi_w)\}$. Solving for D and W given the measurement set M may be treated as a Bayesian optimization problem:

$$\{W, D\} = \underset{\{W,D\}}{\mathrm{argmax}} L(\{W, D\} \mid M), \quad \text{(Eq. 1)}$$

where $L(\{W, D\}|M)$ denotes the likelihood function of $\{W, D\}$ given the observations of the measurement set M. The argmax function is the set of points of the given argument of the likelihood function for which the given function attains its maximum value This optimization problem may be solved using any suitable approach. Suitable approaches may include maximum likelihood, maximum a posterior stochastic optimization, and/or an expectation-maximization approach. In the flowchart of FIG. 4, the Bayesian optimization problem of equation 1 above may involve an iterative optimization approach. Under this framework, the probable set of borehole boundary positions W and probable set of tool center positions D may be iteratively estimated until convergence is achieved.

For example, as shown in FIG. 4, the borehole boundary positions $W^{(k)}$ at iteration (k) may be estimated given the measurement set M and assuming that a previously estimated tool center trajectory $D^{(k-1)}$ at iteration (k−1) is true (block 72). Note that the tool center trajectory $D^{(0)}$ may be initialized to any suitable assumption (for instance, no movement of the tool center), and this may be the previously estimated tool center trajectory $D^{(k-1)}$ used in the first iteration. The borehole boundary positions $W^{(k)}$ may be estimated in accordance with the following relationship:

$$W^{(k)} = \underset{W}{\mathrm{argmax}} L(W \mid M, D^{(k-1)})), \quad \text{(Eq. 2)}$$

where L denotes the likelihood function.

Having estimated a probable set of borehole boundary values at an iteration (k), $W^{(k)}$, the probable tool center trajectory $D^{(k)}$ estimated at iteration (k) may be estimated given the measurement set M and assuming that the previously estimated borehole boundary positions at iteration (k) $W^{(k)}$ is true (block 74). This may be done in accordance with the following relationship:

$$D^{(k)} = \underset{D}{\mathrm{argmax}} L(D \mid M, W^{(k)}). \quad \text{(Eq. 3)}$$

If the borehole boundary positions W set and the tool center trajectory D set achieve convergence or do not achieve convergence (decision block 76), a subsequent iteration k=k+1 (block 77) for block 72 and 74 may take place. Iteration may continue until convergence is achieved (decision block 76) at which point the estimates of the sets of borehole boundary positions W and tool center trajectory D may be stored or used.

It is also understood that the inversion method is performed during a time period during which it is assumed that the borehole boundaries remain the same. The borehole boundary positions are for instance associated with a depth. When measuring the borehole boundaries and the tool center trajectory at a subsequent depth, the inversion method is perform again in its entirety: in this case, borehole boundaries obtained for the previous depth may be set as initial conditions for the borehole boundaries. Alternatively, borehole boundaries and tool center trajectory may be determined independently at each depth.

Estimation when Mud Parameter is Unknown

Figure 5:
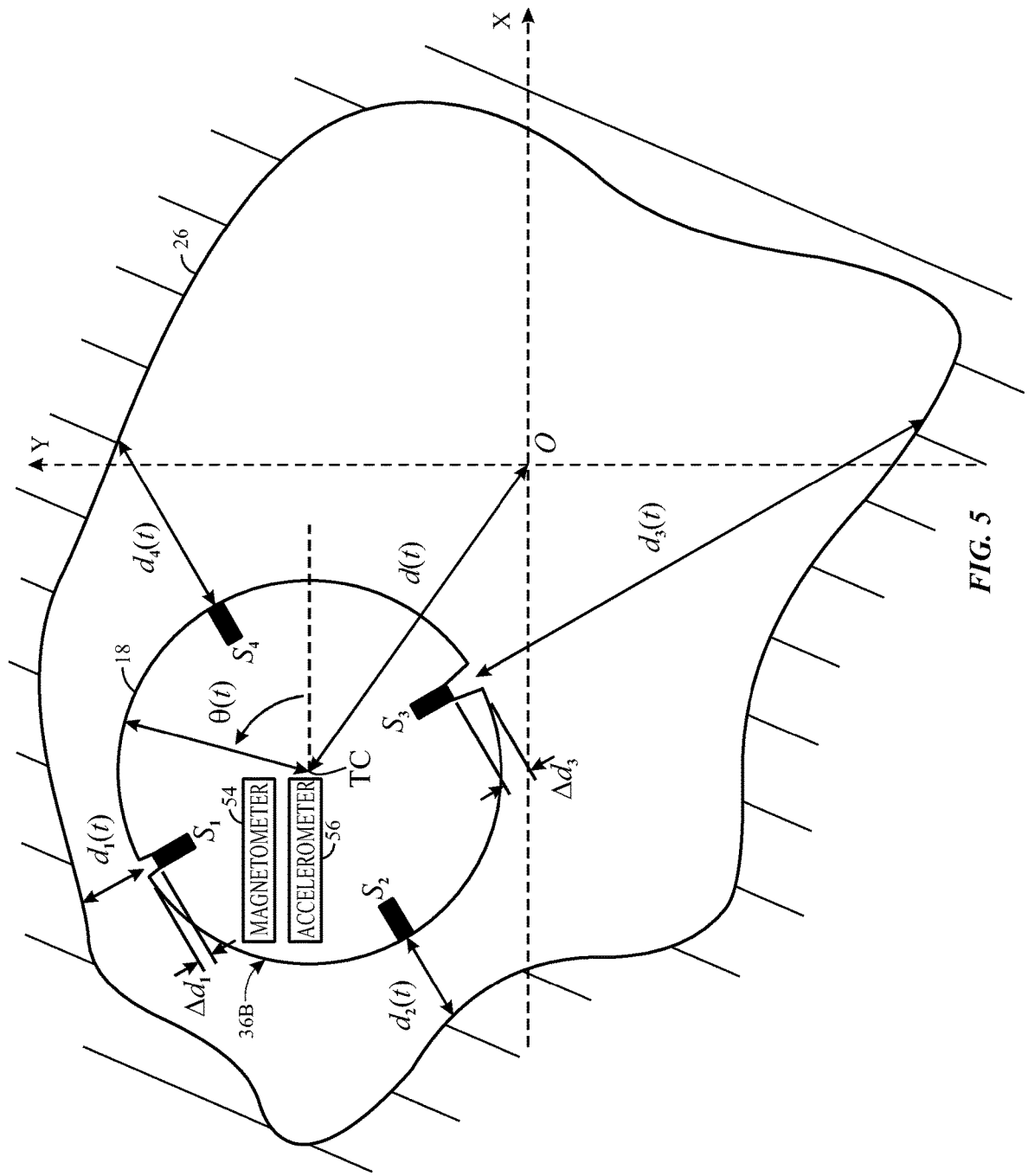
FIG. 5 is a cross-sectional view of the borehole, in which the downhole tool may obtain a measurement of center of mass and/or borehole boundary positions when mud parameter is known, in accordance with an embodiment.

In certain cases, the mud parameter linking the measurement to the distance, ie mud slownes$_m$ in this example, may not be perfectly known or may evolve over time. Under these conditions, the accuracy of the inversion 62 may be degraded. As shown in FIG. 5, however, a modification of the acoustic sensor geometry of the downhole tool 36B may enable the mud slowness $s_m$ to be estimated in line with the other parameters of interest, the borehole boundary positions W and the tool center positions D. In the example of FIG. 5, which represents another example of a cross-sectional view of the borehole 26 at cut lines 2-2 of FIG. 1, the downhole tool 36B is shown to have at least some of the acoustic sensors $S_1$, $S_2$, $S_3$, and/or $S_4$ in a position that is offset by some amount from the radial position of other of the sensors. For instance, as shown in FIG. 5, acoustic sensors $S_1$, and $S_2$, have respective offsets $\Delta d_1$ and $\Delta d_3$ in comparison to the sensors $S_2$, and $S_4$. It may be appreciated that the configuration shown in FIG. 5 may include fewer acoustic sensors provided that there are at least two acoustic sensors $S_1$, $S_2$, $S_3$, and/or $S_4$, at least one of which is radially offset from the other (i.e., has an active acoustic element that is set a different radial distance from the tool center TC compared to the other acoustic sensor).

Therefore, the relation between the propagation time between the sensors and the distance to the borehole are respectively the following:

$$d_1[t_j] + \Delta d_1 = \frac{T_1[t_j]}{s_m} = T_1[t_j] \cdot v_m = d_2[t_j] = \frac{T_2[t_j]}{s_m}$$

$$d_3[t_j] + \Delta d_3 = \frac{T_2[t_j]}{s_m}$$

$$d_4[t_j] = \frac{T_4[t_j]}{s_m}$$

The offset that are known coefficients in the equation enable to derive information about the mud slowness in view of the plurality of measurements points in time in the measurement set.

In other respects, the geometry of the example of FIG. 5 may be generally the same as described above with reference to the configuration of FIG. 2. That is, although the four acoustic sensors $S_1$, $S_2$, $S_3$, and $S_4$ are shown by way of example, any suitable number of acoustic sensors may be used in other embodiments. Indeed, in one example, just two acoustic sensors (e.g., $S_1$ and $S_2$) with one sensor being radially offset relative to the other, may be used without other acoustic sensors. Furthermore, while the positions of the acoustic sensors $S_1$, $S_2$, $S_3$, and $S_4$ are azimuthally offset from one another at right angles, the acoustic sensors $S_1$, $S_2$, $S_3$, and $S_4$ may take any other suitable azimuthal position. When at least one pair of acoustic sensors (e.g., $S_1$, and $S_3$) are disposed diametrically opposite one another, the estimations of this disclosure may be more efficient, but even tool configurations without diametrically opposite acoustic sensors (e.g., $S_1$, and $S_3$) may be used to obtain a solution according to the systems and methods of this disclosure.

In any case, for an example where the acoustic sensors are all disposed around a symmetrical tool housing, as generally illustrated in FIG. 5, as least one of the sensors $S_i$ is placed such that there is a slight offset between the active element of the sensor $S_i$ with respect to the external surface of the downhole tool 36B. The value of the offset for each sensor $S_i$ may be known either by design or through an initial calibration before obtaining measurements.

With the additional information brought about by the offset distance the value of the mud slowness $s_m$ at each iteration $^{(k)}$ may be estimated inline with the other parameters of interest, the borehole boundary positions W and the tool center positions D. As shown by a flowchart in FIG. 6, even when mud slowness is not already known, the set of borehole boundary positions W and the set of tool center positions D may be determined.

It is understood that the tool of FIG. 2 has been described with acoustic sensors but sensors $S_1$, $S_2$, $S_3$, and/or $S_4$ may be any type of sensors able to measure a distance between the tool and the borehole, such as electromagnetic sensors. If the measured parameter enabling to obtain a representative value for the distance is not the travel time, it will be understood that the measurements set will be different but the method is still applicable. For instance, if the sensors are electromagnetic sensors as disclosed above, the known relationship enabling to link the measurement to the distance depends on the mud dielectric value. In this case, the measurement set will comprise the ratio of current depending on the mud dielectric value as a measurement variable instead of the ratio of travel time and mud slowness.

Figure 6:
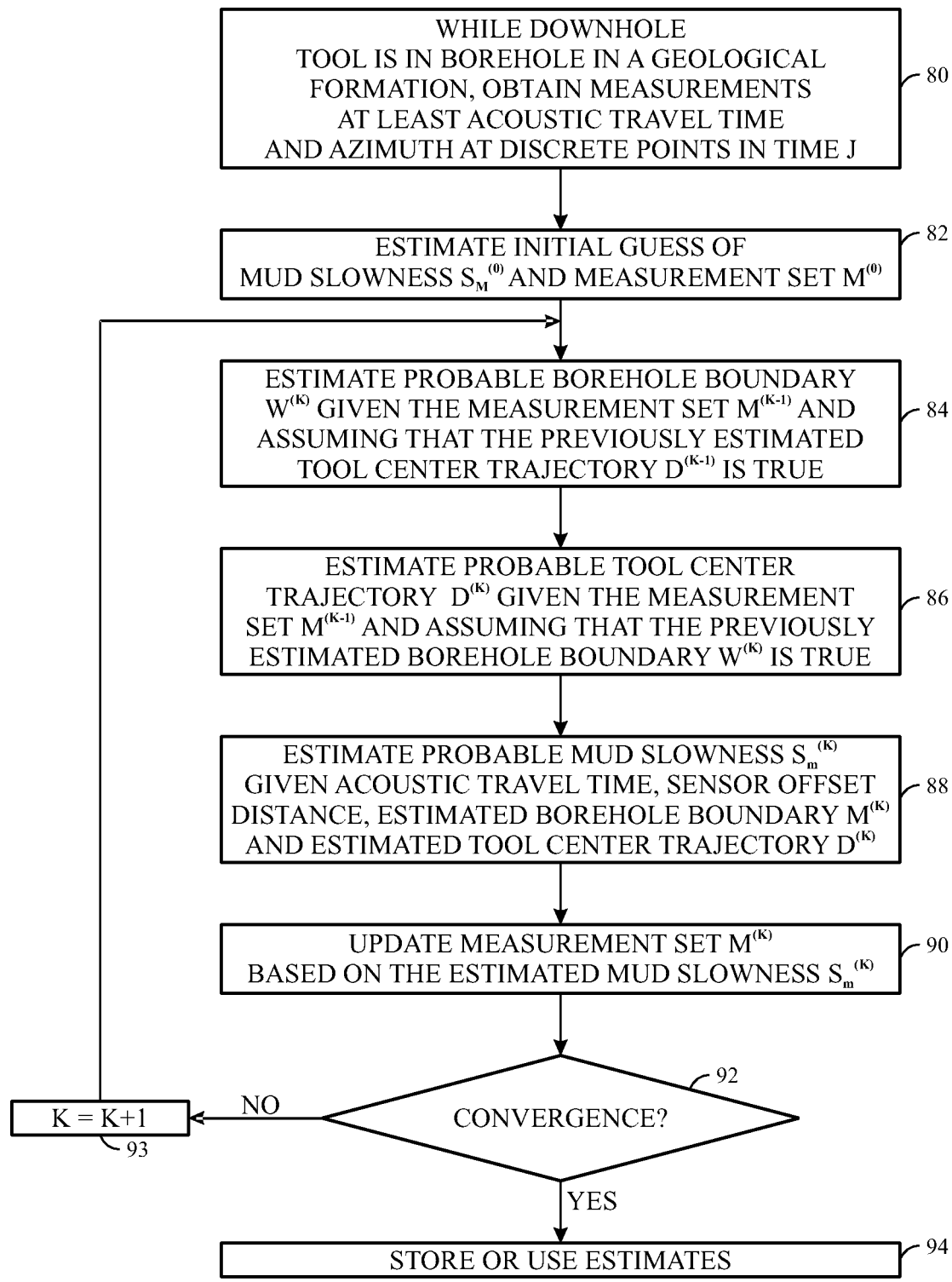
FIG. 6 is a flowchart of a particular example of an inversion to obtain tool center of mass, borehole boundary, and/or mud parameter when the mud parameter is not known, in accordance with an embodiment.

The flowchart of FIG. 6 may begin when measurements are obtained by the downhole tool 36B, which includes at least acoustic travel time and azimuth at discrete points and time j (block 80). The measurements may be defined as including a number of discrete measurements at points in time j as already explained above.

In this case, as the mud slowness is unknown, and a new value of the mud slowness is determined at each iteration (k), the measurement set changes at each iteration of the inversion method, as will be explained below. The measurement set estimated at each iteration may be defined as follows:

$$M^{(k)} = \left\{ \left( \frac{T_i[t_j]}{s_m^{(k)}}, \theta[t_j] \right)_{j=N_o \ldots N_m}^{i=1 \ldots 4} \right\}.$$

More generally, when the measurement representative of the distance is not a travel time, the measurement set may be defined as follows:

$$\{(d(M_i[t_j]; p_m^{(k)}, \theta[t_j])_{j=N_o \ldots N_m}^{i=1 \ldots 4}\}.$$

where $M_i[t_j]$ is the measurement representative of distance taken by sensor i, at measurement time $t_j$, $p_m^{(k)}$ is a parameter of the mud that has influence on the measurement that is unknown and estimated at iteration (k) and $d(M_i[t_j]; p_m^{(k)}$ is the distance derived from the measurement and mud parameters $p_m^{(k)}$. For instance, when the sensor for measuring a parameter representative of the distance is an electromagnetic sensor, the mud parameter is a mud dielectric value. The mud parameter $p_m^{(0)}$, here $s_m^{(0)}$ may be initialized to any suitable initial estimate based on known or expected characteristics of the drilling mud 24 and initial measurement set $M^{(0)}$ may be initialized as well on the basis of the value $p_m^{(0)}$ (block 82).

An inversion at iteration $^{(k)}$ may involve estimating a probable set of borehole boundary positions $W^{(k)}$ given the measurement set $M^{(k-1)}$ as determined based on the previously estimated value of mud slowness $s_m^{(k-1)}$ and assuming that the previously estimated set of tool center trajectory $D^{(k-1)}$ is true (block 84). For example, this may take place in accordance with the following relationship:

$$W^{(k)} = \underset{W}{\mathrm{argmax}} L(W \mid M^{(k-1)}, D^{(k-1)}))], \quad \text{(Eq. 4)}$$

where L represents the likelihood function.

Assuming that this estimate borehole boundary positions $W^{(k)}$ is true, the probable tool center trajectory $D^{(k)}$ given the measurement set $M^{(k-1)}$ as determined based on the previously estimated value of mud slowness $s_m^{(k-1)}$ may be estimated (block 86). For example, the estimate may be obtained in accordance with the following relationship:

$$D^{(k)} = \underset{D}{\mathrm{argmax}} L(D \mid M^{(k-1)}, W^{(k)}). \quad \text{(Eq. 5)}$$

The probable mud slowness $s_m^{(k)}$ for the iteration $^{(k)}$ may be estimated (block 88). For example, the mud slowness $s_m^{(k)}$ may be estimated by solving an optimization problem in accordance with the following relationship:

$$s_m^{(k)} = \underset{s_m}{\mathrm{argmax}} L(s_m \mid M^{(k-1)}, D^{(k)}, W^{(k)}), \quad \text{(Eq. 6)}$$

where $L(s_m \mid M^{(k-1)}, D^{(k)}, W^{(k)})$ denotes the likelihood function of the mud slowness $s_m$ given the measurement set (e.g., distance values based the measured travel times $T_i[t_j]$ and the respective azimuthal measurements), and the estimated borehole boundary positions $W^{(k)}$ and estimated tool center positions $D^{(k)}$ at that the iteration $^{(k)}$. This maximization problem may be solved using any suitable optimization method. These include, but are not restricted to, gradient descent, Newton's algorithm, Broyden-Fletcher-Goldfarb-Shanno (BFGS), and the like.

Thereafter, the measurement set $$M^{(k)} = \left\{ \left( \frac{T_i[t_j]}{s_m^{(k)}}, \theta[t_j] \right)_{j=N_o \ldots N_m}^{i=1 \ldots 4} \right\}$$

may be updated based on the newly estimated mud slowness $s_m^{(k)}$ (block 90).

If the values have not converged to solution (decision block 92), iteration may continue by advancing to a subsequent iteration k (block 93). Blocks 84, 86, 88, and 90 may continue to be iterated until convergence (decision block 92) is obtained. The resulting resolved estimates may be stored or used (block 94).

A second embodiment of the method is also described by the flow diagram 60 of FIG. 3. Similarly as what was described in the first embodiment, the inversion 62 may receive a measurement set M' as an input. This time, the measurement set M' may include primary measurements 64 (for instance the distance $d_1[t_j]$ taken by sensor S1—the parameter linking time of propagation and distance, such as mud slowness when S1 is an acoustic sensor, being known—and the azimuth $\theta[t_j]$ as explained above), and also include secondary measurements 66 such as a measurement from an accelerometer 56 that enables to obtain the acceleration of the tool $A[t_j]$ at each time. In the following, the measurement considered will be $A'[t_j]$ which is the acceleration measured by the accelerometer corrected for the acceleration of the earth generated on the tool, that is constant. In this embodiment, the measurement set M may obviously comprise additional primary measurements from sensors $S_2$ to $S_4$ or additional secondary measurements.

The parameters of interest 68 include the tool center trajectory 36B (e.g., $D'=\{d[t_j]\angle\varphi_d[t_j]\}$), as well as the borehole 26 boundary (e.g., $W'=\{\varphi_w \rightarrow w(\varphi_w)\}$).

FIG. 4 also describes the flowchart for determining the set of estimated tool center trajectory D' and the set of the points located on the borehole boundary positions W'.

However, in this case, the set of all measurements M' is $$M'=\{(d_1[t_j],\theta[t_j],A[t_j])\}_{j=No\ldots Nm}.$$

As explained before, solving for D' and W' given the measurement set M' may be treated as a Bayesian optimization problem:

$$\{W', D'\} = \underset{\{W',D'\}}{\mathrm{argmax}} L(\{W', D'\} | M'), \qquad (\mathrm{Eq.~1})$$

where $L(\{W', D'\}|M')$ denotes the likelihood function of $\{W', D'\}$ given the observations of the measurement set M'. As disclosed previously, the Bayesian optimization problem of equation 1 above may involve an iterative optimization approach using iteratively Equation 2 and Equation 3 as explained in relationship with the first embodiment (at blocks 72 and 74). Then, the iterative approach is repeated until convergence is reached.

Difference between the first and second embodiment is that when using Equation 3, the accelerometer measurement is linked to the trajectory D'(t) of the center of the tool by the following equation:

$$A'(t) = \frac{\partial D'(t)}{\partial t}.$$

Examples

Figure 7:
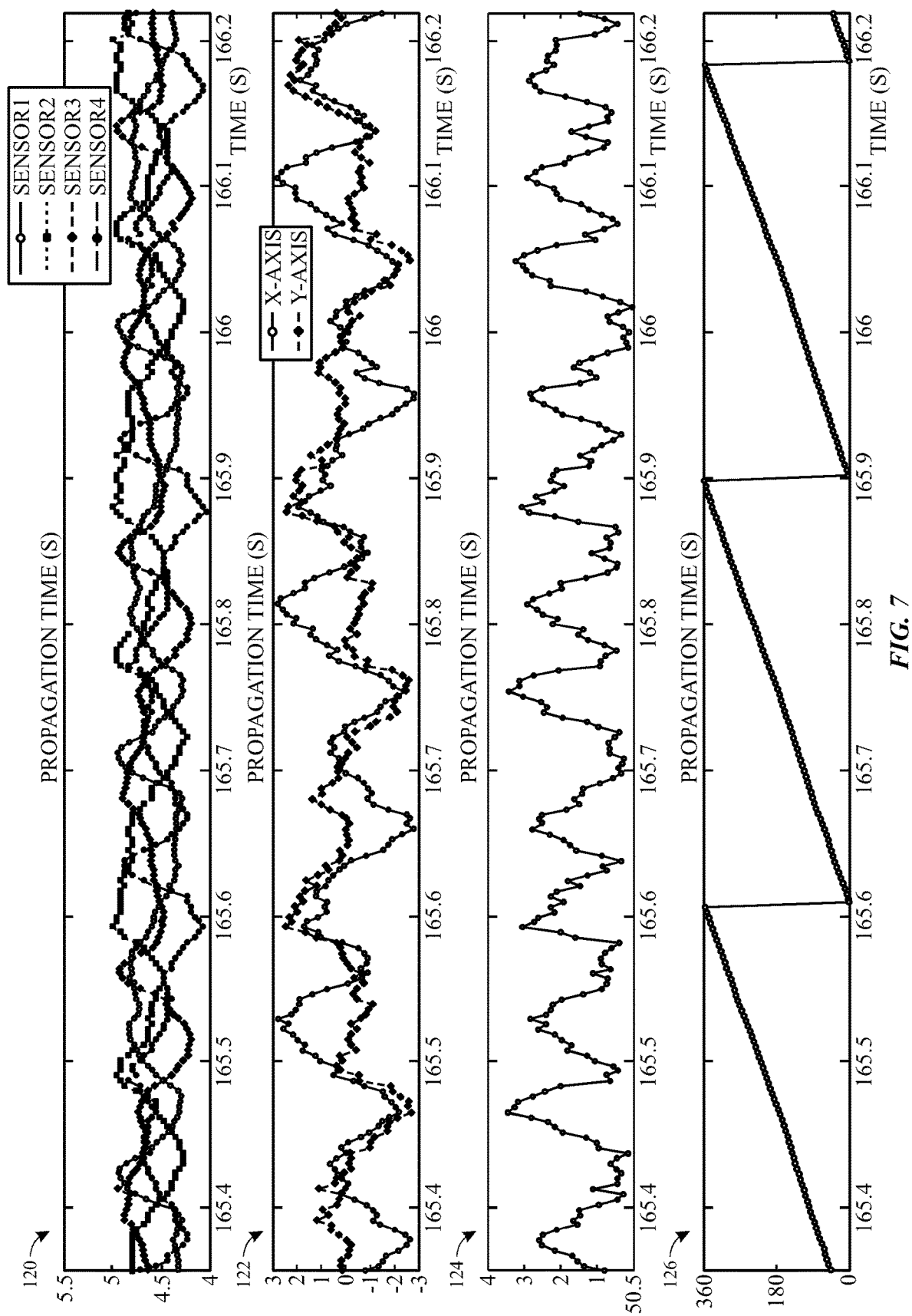
FIG. 7 is a collection plots of simulated data obtained for a non-elliptical borehole while the tool center of the tool is moving, in accordance with an embodiment.
Figure 8:
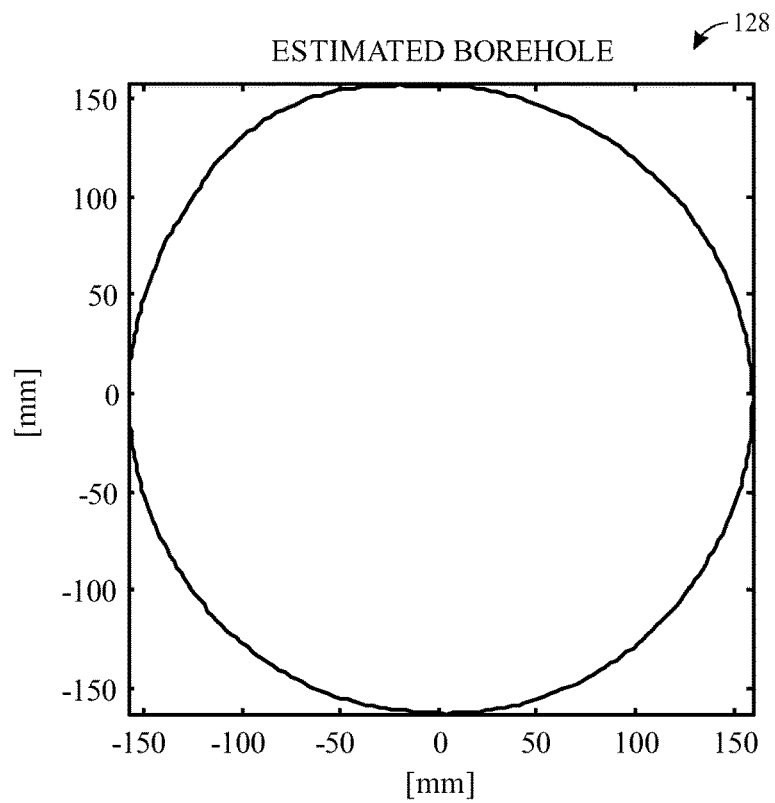
FIG. 8 is a plot of an estimated borehole based on the simulated data of FIG. 7 using the systems and methods of this disclosure, in accordance with an embodiment.
Figure 9:
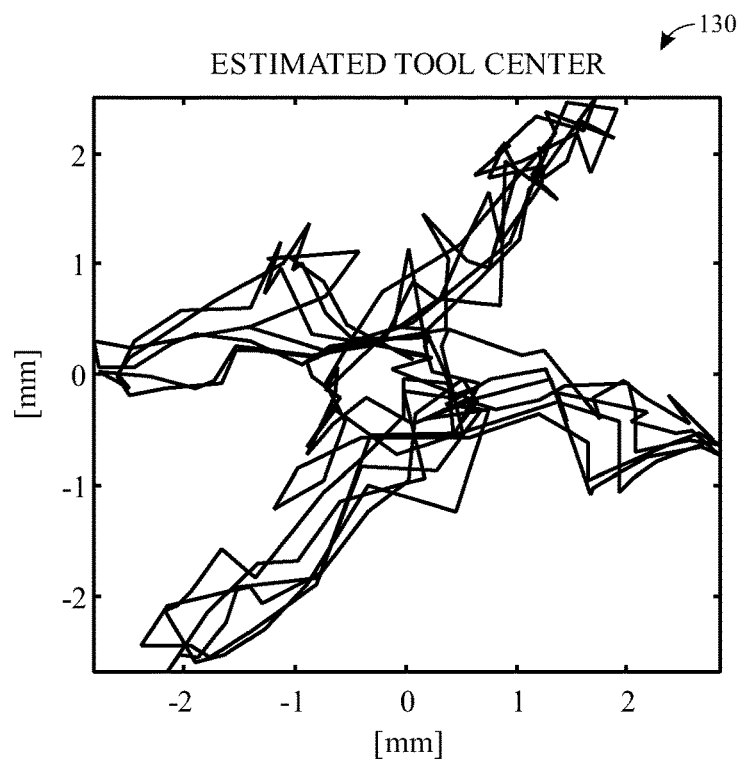
FIG. 9 is a plot of estimated LWD tool center over time based on the simulated data of FIG. 7 using the systems and methods of this disclosure, in accordance with an embodiment.

FIGS. 7, 8, and 9 represent the result of inversion according to the first embodiment on the same dataset for three revolutions of the downhole tool 36B. FIG. 7 includes four plots occurring over the three revolutions 120, 122, 124, and 126. The first plot 120 represents the measured propagation times as obtained by the four sensors S1, S2, S3, and S4 over time. The second plot 122 represents the estimated value of tool center position (x, y) of the downhole tool 36B over time. The third plot 124 represents the estimated absolute distance of the downhole tool 36B over time. The fourth plot 126 represents the measured azimuth of the downhole tool 36B over time. Shown in (x, y) form are the estimated borehole boundary (plot 128 of FIG. 8) and estimated tool center trajectory (plot 130 of FIG. 9). As can be seen, the downhole tool 36B is moving substantially over time while the acoustic measurements are being obtained. The inversion thus allows for useful measurements and parameters of interest to be obtained despite such motion.

As already explained, the values obtained from the method for the tool center trajectory, borehole boundaries or mud parameter may be used for correcting images of the borehole obtained by an imaging sensor.

Technical effects thus may include substantial improvements in a variety of real-time or recorded-mode applications that may involve measurements of borehole boundary, tool center position, or mud parameter. For example, caliper measurements may enable borehole stability monitoring and/or drilling optimization in real time or improved post-processing in a recorded mode. Drilling dynamics that may be considered in real time may include drilling optimization considerations and/or real-time identification of shocks, vibration, whirl severity, and so forth. Such information may be used by the driller to assess the vibrational state downhole and adjust the drilling parameters accordingly.

For instance, in a preliminary operation, a Fourier analysis of the trajectory of the tool may enable to distinguish low frequency modes (corresponding to whirl) and high frequency modes (corresponding to shocks). When this distinction has been made, based on the trajectory of the center of the tool, and in particular from its amplitude and its direction, it may be determined if the whirl is forward, backward or chaotic. Concerning the shocks, the relative distance to the formation may be derived by the relative distance of the center of the tool from the formation (that may be obtained from the boundary W and trajectory of the center D) and by the acceleration of the center of the tool (obtained by differentiating twice the trajectory of the center D) or measured.

Post processing in recorded mode for drilling dynamics may enable an improved post mortem analysis and/or possible drilling insurance analysis. Mud parameters monitoring can take place in real time and provide post mortem analysis of the mud parameters in recorded mode.

Other well logging parameters of interest may benefit, including resistivity, ultrasonic, and rugosity image logging, to name a few. For instance, in real time or recorded mode, resistivity or ultrasonic measurements may undergo lateral astigmatism correction or axial astigmatism correction based on the estimates of this disclosure. Outliers monitoring may take place for a rugosity image in real time, and in recorded mode, side information may become more available for interpretation.

Further, it has been presented that, at each iteration, the borehole boundary was determined before the tool center trajectory. However, the method would also work if the tool center trajectory was estimated at each iteration before the borehole boundaries. Similarly, the iterative method may comprise determining the mud parameter, updating the measurement and determining the tool center trajectory on the basis of the updated measurement at iteration (k) and of the estimated mud parameter at iteration (k) and estimation borehole boundaries at iteration (k−1), the borehole boundary being then estimated on the basis of the updated measurement and estimated mud parameter and tool center trajectory at estimation(k). Any order for estimating the 3 unknown parameters is valid.

The specific embodiments described above have been shown by way of example, and it should be understood that these embodiments may be susceptible to various modifications and alternative forms. It should be further understood that the claims are not intended to be limited to the particular forms discloses, but rather to cover modifications, equivalents, and alternatives falling within the spirit of this disclosure.

For example, some embodiments may include:

A method comprising:

placing a downhole tool into a borehole in a geological formation;

obtaining a set of measurements using the downhole tool, wherein the set of measurements comprises, for each of a plurality of measurement times:

a measurement representative of a distance between a sensor and a borehole boundary; and a measurement representative of an azimuth of the downhole tool; and iteratively estimating, using a processor, a set of borehole boundary distances from a point in the borehole and a tool center trajectory in relation to the point in the borehole, at least partly by:

estimating at an iteration one of the set of the borehole boundary distances and tool center trajectory based on the set of measurements assuming an estimation relating to the other of the set of borehole boundary distances and tool center trajectory at a previous iteration is true;

estimating at the iteration the other of the set of borehole boundary distances and tool center trajectory based on the set of measurements assuming the estimation relating to the one of the set of borehole boundary distances and tool center trajectory at the iteration is true; and repeating at least the estimating of the set of borehole boundary distances and the estimating of the tool center trajectory at a further iteration at least until convergence.

In the method, the set of borehole boundary distances and of tool center trajectory may be estimated based on known mud parameter.

In the method, the set of borehole boundary distances and tool center trajectory may be estimated based on an unknown mud parameter, wherein a mud parameter value is iteratively estimated.

The unknown mud parameter may be a mud slowness or a mud dielectric value.

The set of measurements may be updated based on the iteratively estimated mud parameter value and used in estimating the set of borehole boundary distances and tool center trajectory.

The estimation may comprise iteratively:

estimating at an iteration one of the set of the borehole boundary distances, tool center trajectory and mud parameter based on the set of measurements determined from a previous iteration assuming an estimation relating to the others of the set of borehole boundary distances, tool center trajectory at the previous iteration is true;

estimating at the iteration the other of the set of borehole boundary distances and tool center trajectory based on the set of measurements determined from the previous iteration assuming the estimation relating to the one of the set of borehole boundary distances and tool center trajectory at the iteration is true; and estimating at the iteration the mud parameter based on the set of measurements determined from the previous iteration assuming the estimation relating to the set of borehole boundary distances and tool center trajectory at the iteration is true;

updating the set of measurements based on the estimated mud parameter at the iteration, and repeating at least the estimating of the set of borehole boundary distances, the estimating of the tool center trajectory and the estimation of mud parameter at a further iteration at least until convergence The measurement representative of a distance may comprise a travel time of acoustic signal between an acoustic sensor and borehole boundaries, and/or a ratio of currents measured by electrodes of an electromagnetic sensor.

The unknown mud parameter may be a mud slowness when the measurement representative of a distance comprises a travel time of acoustic signal between an acoustic sensor and borehole boundaries or a mud dielectric value when the measurement representative of a distance comprises a ratio of currents measured by electrodes of an electromagnetic sensor.

The set of measurements may comprise at least one additional measurement obtained by an accelerometer, a gyroscope, a strain gauge, or any combination thereof.

The disclosure also comprises a method comprising: placing a downhole tool into a borehole in a geological formation; obtaining a set of measurements using the downhole tool, wherein the set of measurements comprises, for each of a plurality of measurement times:

a plurality of measurement representative of a distance between a sensor and a borehole boundary; and a measurement representative of an azimuth of the downhole tool; and iteratively estimating, using a processor, a set of borehole boundary distances from a point in the borehole and a tool center trajectory in relation to the point in the borehole, at least partly by:

estimating at an iteration one of the set of the borehole boundary distances and tool center trajectory based on the set of measurements assuming an estimation relating to the other of the set of borehole boundary distances and tool center trajectory at a previous iteration is true;

estimating at the iteration the other of the set of borehole boundary distances and tool center trajectory based on the set of measurements assuming the estimation relating to the one of the set of borehole boundary distances and tool center trajectory at the iteration is true; and repeating at least the estimating of the set of borehole boundary distances and the estimating of the tool center trajectory at a further iteration at least until convergence.

The disclosure also comprises a method comprising:

placing a downhole tool into a borehole in a geological formation;

obtaining a set of measurements using the downhole tool, wherein the set of measurements comprises, for each of a plurality of measurement times:

a measurement representative of a distance between a sensor and a borehole boundary;

a measurement representative of an acceleration of the downhole tool; and a measurement representative of an azimuth of the downhole tool; and iteratively estimating, using a processor, a set of borehole boundary distances from a point in the borehole and a tool center trajectory in relation to the point in the borehole, at least partly by:

estimating at an iteration one of the set of the borehole boundary distances and tool center trajectory based on the set of measurements assuming an estimation relating to the other of the set of borehole boundary distances and tool center trajectory at a previous iteration is true;

estimating at the iteration the other of the set of borehole boundary distances and tool center trajectory based on the set of measurements assuming the estimation relating to the one of the set of borehole boundary distances and tool center trajectory at the iteration is true; and repeating at least the estimating of the set of borehole boundary distances and the estimating of the tool center trajectory at a further iteration at least until convergence.

A system according to the disclosure may include:

at least a sensor disposed in a downhole tool configured obtain a set of measurements representative of a distance between the sensor and a borehole boundary;

at least a sensor disposed in the downhole tool configured to obtain a set of measurements representative of an azimuth of the tool; and a processor configured to estimate, a set of borehole boundary distances from a point in the borehole and a tool center trajectory in relation to the point in the borehole, at least partly by iteratively:

estimating at an iteration one of the set of the borehole boundary distances and tool center trajectory based on the set of measurements assuming an estimation relating to the other of the set of borehole boundary distances and tool center trajectory at a previous iteration is true;

estimating at the iteration the other of the set of borehole boundary distances and tool center trajectory based on the set of measurements assuming the estimation relating to the one of the set of borehole boundary distances and tool center trajectory at the iteration is true; and repeating at least the estimating of the set of borehole boundary distances and the estimating of the tool center trajectory at a further iteration at least until convergence.

The system may comprise a plurality of sensors for measurements representative of distances in a first embodiment and at least a sensor for measurements representative of a distance and a sensor for taking measurements representative of an acceleration of the tool.

In the system:

the at least one sensor may be configured to estimate the distance between the sensor and borehole boundary comprises at least one acoustic sensor for obtaining a travel time between the sensor and borehole boundary, such as a pulse echo ultrasonic sensor or a ultrasonic pitch-catch sensor, or an electromagnetic sensor for obtaining a ratio of currents measured by electrodes of the sensor, or any combination thereof, and/or the at least one sensor may be configured to measure the azimuth comprises a magnetometer or a rotational speed sensor, or any combination thereof.

The system may include at least one additional sensor for providing additional measurement relative to the tool, such as an accelerometer, a gyroscope, a strain gauge, or any combination thereof.

In the system, the at least one acoustic sensor may comprise a plurality of acoustic sensors, at least two of which are diametrically opposite one another.

In the system, the at least one acoustic sensor may comprise a plurality of acoustic sensors in which none of the acoustic sensors is diametrically opposite another of the acoustic sensors.

In the system, the at least one sensor may be configured to obtain measurements representative of the distance between the sensor and the borehole boundary may comprise a first sensor disposed in the downhole tool a first radial distance from the center of the downhole tool and a second sensor disposed in the downhole tool a second radial distance from the center of the downhole tool offset from the first radial distance.

In the system, the processor may be configured to estimate the mud parameter values using gradient descent, Newton's algorithm, or Broyden-Fletcher-Goldfarb-Shanno (BFGS), or a combination thereof.

In the system, the processor may be configured to iteratively estimate a mud parameter value and update the measurement set for each iteration that the borehole boundary and the tool center are estimated.

In the system, the processor may be configured to perform the following operations:

estimating at an iteration one of the set of the borehole boundary distances and tool center trajectory based on the set of measurements determined from a previous iteration assuming an estimation relating to the other of the set of borehole boundary distances and tool center trajectory at the previous iteration is true;

estimating at the iteration the other of the set of borehole boundary distances and tool center trajectory based on the set of measurements determined from the previous iteration assuming the estimation relating to the one of the set of borehole boundary distances and tool center trajectory at the iteration is true; and estimating at the iteration the mud parameter based on the set of measurements determined from the previous iteration assuming the estimation relating to the set of borehole boundary distances and tool center trajectory at the iteration is true;

updating the set of measurements based on the estimated mud parameter at the iteration, and repeating at least the estimating of the set of borehole boundary distances, the estimating of the tool center trajectory and the estimation of mud parameter at a further iteration at least until convergence In the system, the processor may carry out any of the processes related to the method embodiments discussed above.

In the system, the sensors and the processor may both be disposed in the downhole tool.

In the system, the sensors may be disposed in the downhole tool and the processor may be disposed in a data processing system remote from the downhole tool.

The embodiments may also include one or more tangible, non-transitory, machine-readable media comprising instructions, when executed by a processor, to:

receive a set of measurements obtained by a downhole tool, wherein the set of measurements comprises measurements representative of distances from a sensor to a borehole boundary and of azimuths obtained over a plurality of measurement time instants; and iteratively estimating, using a processor, a set of borehole boundary distances from a point in the borehole and a tool center trajectory in relation to the point in the borehole, at least partly by:

estimating at an iteration one of the set of the borehole boundary distances and tool center trajectory based on the set of measurements assuming an estimation relating to the other of the set of borehole boundary distances and tool center trajectory at a previous iteration is true;

estimating at the iteration the other of the set of borehole boundary distances and tool center trajectory based on the set of measurements assuming the estimation relating to the one of the set of borehole boundary distances and tool center trajectory at the iteration is true; and repeating at least the estimating of the set of borehole boundary distances and the estimating of the tool center trajectory at a further iteration at least until convergence.

The mud parameter may be known and the set of borehole boundary positions $W^{(k)}$ for a particular iteration k and the set of tool center positions $D^{(k)}$ for the particular iteration k may be estimated in accordance with the following relationships:

$$W^{(k)} = \underset{W}{\mathrm{argmax}} L(W \mid M, D^{(k-1)}); \text{ and}$$

$$D^{(k)} = \underset{D}{\mathrm{argmax}} L(D \mid M, W^{(k)})$$

where L represents the likelihood function and M represents the set of measurements.

The mud parameter $s_m^{(k)}$ for a particular iteration k may be unknown and the set of borehole boundary positions $W^{(k)}$ for the particular iteration k and the set of tool center positions $D^{(k)}$ for the particular iteration k may be estimated in accordance with the following relationships:

$$W^{(k)} = \underset{W}{\mathrm{argmax}} L(W \mid M^{(k-1)}, , D^{(k-1)})$$

$$D^{(k)} = \underset{D}{\mathrm{argmax}} L(D \mid M^{(k-1)}, , W^{(k)})$$

$$p_m^{(k)} = \underset{s_m}{\mathrm{argmax}} L(p_m \mid M^{(k-1)}, D^{(k)}, W^{(k)})$$

$$M^{(k)} = \{(d(M_i[t_j]; p_m^{(k)}), \theta[t_j])_{j=N_o \ldots N_m}^{i=1 \ldots 4}\}$$

Where L represents the likelihood function, $M^{(k)}$ represents the set of measurements estimated at iteration k, $M_i[t_j]$ represents measurement representative of distance taken by a sensor i at a measurement time $t_j$, $p_m^{(k)}$ is an unknown mud parameter that has influence on the measurement and estimated at iteration (k) $d_i$, represents the distance obtained from the measurement representative of the distance by sensor i and the mud parameter, and $\theta[t_j]$ represents measured azimuth at measurement time $t_j$.

The invention claimed is:

1. A method comprising:
placing a downhole tool into a borehole in a geological formation;
obtaining a set of measurements using the downhole tool, wherein the set of measurements comprises, for each of a plurality of measurement times:
a measurement representative of a distance between a sensor and a borehole boundary; and
a measurement representative of an azimuth of the downhole tool; and
iteratively estimating, using a processor, a set of borehole boundary distances from a point in the borehole and a tool center trajectory in relation to the point in the borehole, at least partly by:
estimating at an iteration one of the set of the borehole boundary distances and tool center trajectory based on the set of measurements assuming an estimation relating to the other of the set of borehole boundary distances and tool center trajectory at a previous iteration is true;
estimating at the iteration the other of the set of borehole boundary distances and tool center trajectory based on the set of measurements assuming the estimation relating to the one of the set of borehole boundary distances and tool center trajectory at the iteration is true; and
repeating at least the estimating of the set of borehole boundary distances and the estimating of the tool center trajectory at a further iteration at least until convergence.

2. The method of claim 1, wherein the set of borehole boundary distances and tool center trajectory are estimated based on an unknown mud parameter, wherein a mud parameter value is iteratively estimated.

3. The method of claim 2, wherein the unknown mud parameter is a mud slowness or a mud dielectric value.

4. The method of claim 3, wherein the set of measurements is updated based on the iteratively estimated mud parameter value and used in estimating the set of borehole boundary distances and tool center trajectory.

5. The method of claim 1, wherein the set of measurements comprises measurements representative of a plurality of distances between a respective plurality of sensors and borehole boundaries.

6. The method of claim 5, wherein at least one of the sensors of the plurality is disposed in the downhole tool a first radial distance from the center of the downhole tool and a second sensor of the plurality is disposed in the downhole tool at a second radial distance from the center of the downhole tool offset from the first radial distance, so that information on the mud parameter is derived from the plurality of distances.

7. The method of claim 1, wherein the measurement representative of a distance comprises a travel time of acoustic signal between an acoustic sensor and borehole boundaries, and/or a ratio of currents measured by electrodes of an electromagnetic sensor.

8. The method of claim 1, wherein the set of measurements comprises at least one additional measurement relating to a dynamic, an orientation, a bending, a torsion, or a position of the tool center.

9. The method of claim 1, comprising associating the estimated values of the tool center trajectory, borehole boundary distances, and optionally mud parameter, with a depth and obtaining estimated values for a plurality of depths in the wellbore.

10. The method of claim 9, comprising obtaining an image of the wellbore and correcting the image of the borehole based on the estimated values of the tool center trajectory, borehole boundary distances, and optionally mud parameter, at the plurality of depths.

11. A method comprising:
placing a downhole tool into a borehole in a geological formation;
obtaining a set of measurements using the downhole tool, wherein the set of measurements comprises, for each of a plurality of measurement times:
a plurality of measurement representative of a distance between a sensor and a borehole boundary; and
a measurement representative of an azimuth of the downhole tool; and
iteratively estimating, using a processor, a set of borehole boundary distances from a point in the borehole and a tool center trajectory in relation to the point in the borehole, at least partly by:
estimating at an iteration one of the set of the borehole boundary distances and tool center trajectory based on the set of measurements assuming an estimation relating to the other of the set of borehole boundary distances and tool center trajectory at a previous iteration is true;
estimating at the iteration the other of the set of borehole boundary distances and tool center trajectory based on the set of measurements assuming the estimation relating to the one of the set of borehole boundary distances and tool center trajectory at the iteration is true; and repeating at least the estimating of the set of borehole boundary distances and the estimating of the tool center trajectory at a further iteration at least until convergence.

12. A method comprising:

placing a downhole tool into a borehole in a geological formation;

obtaining a set of measurements using the downhole tool, wherein the set of measurements comprises, for each of a plurality of measurement times:
   a measurement representative of a distance between a sensor and a borehole boundary;
   a measurement representative of an acceleration of the downhole tool; and
   a measurement representative of an azimuth of the downhole tool;

iteratively estimating, using a processor, a set of borehole boundary distances from a point in the borehole and a tool center trajectory in relation to the point in the borehole, at least partly by:
   estimating at an iteration one of the set of the borehole boundary distances and tool center trajectory based on the set of measurements assuming an estimation relating to the other of the set of borehole boundary distances and tool center trajectory at a previous iteration is true;
   estimating at the iteration the other of the set of borehole boundary distances and tool center trajectory based on the set of measurements assuming the estimation relating to the one of the set of borehole boundary distances and tool center trajectory at the iteration is true; and
   repeating at least the estimating of the set of borehole boundary distances and the estimating of the tool center trajectory at a further iteration at least until convergence.

13. A system comprising:

at least a sensor disposed in a downhole tool configured obtain a set of measurements representative of a distance between the sensor and a borehole boundary;

at least a sensor disposed in the downhole tool configured to obtain a set of measurements representative of an azimuth of the tool; and a processor configured to estimate, a set of borehole boundary distances from a point in the borehole and a tool center trajectory in relation to the point in the borehole, at least partly by iteratively:
   estimating at an iteration one of the set of the borehole boundary distances and tool center trajectory based on the set of measurements assuming an estimation relating to the other of the set of borehole boundary distances and tool center trajectory at a previous iteration is true;
   estimating at the iteration the other of the set of borehole boundary distances and tool center trajectory based on the set of measurements assuming the estimation relating to the one of the set of borehole boundary distances and tool center trajectory at the iteration is true; and
   repeating at least the estimating of the set of borehole boundary distances and the estimating of the tool center trajectory at a further iteration at least until convergence.

14. The system of claim 13, wherein:

the at least one sensor configured to estimate the distance between the sensor and borehole boundary comprises at least one acoustic sensor for obtaining a travel time between the sensor and borehole boundary, such as a pulse echo ultrasonic sensor or a ultrasonic pitch-catch sensor, or an electromagnetic sensor for obtaining a ratio of currents measured by electrodes of the sensor, or any combination thereof, and/or the at least one sensor configured to measure the azimuth comprises a magnetometer or a rotational speed sensor, or any combination thereof.

15. The system of any of claim 13, wherein the at least one sensor configured to obtain measurements representative of the distance between the sensor and the borehole boundary comprises a first sensor disposed in the downhole tool a first radial distance from the center of the downhole tool and a second sensor disposed in the downhole tool a second radial distance from the center of the downhole tool offset from the first radial distance.

16. The system of claim 14, wherein the processor is configured to iteratively estimate a mud parameter value and update the measurement set for each iteration that the borehole boundary and the tool center are estimated.

* * * * *